(12) United States Patent
Sheikh (10) Patent No.: US 10,057,423 B1
(45) Date of Patent: Aug. 21, 2018

(54) SYSTEM AND METHOD FOR RESPONDING TO TELEPHONE CALLS AND WRITTEN COMMUNICATIONS

(71) Applicant: Babak Sheikh, Weston, FL (US)

(72) Inventor: Babak Sheikh, Weston, FL (US)

( * ) Notice: Subject to any disclaimer, the term of this patent is extended or adjusted under 35 U.S.C. 154(b) by 288 days.

(21) Appl. No.: 14/957,703

(22) Filed: Dec. 3, 2015

(51) Int. Cl.
*H04M 1/64* (2006.01)
*H04M 3/533* (2006.01)
*H04M 1/725* (2006.01)
*H04M 3/53* (2006.01)

(52) U.S. Cl.
CPC ... *H04M 3/53341* (2013.01); *H04M 1/72597* (2013.01); *H04M 3/5307* (2013.01); *H04M 3/53333* (2013.01)

(58) Field of Classification Search
CPC ........... H04M 3/5183; H04M 3/42068; H04M 3/436; H04M 1/72552; H04M 1/72583; H04M 2203/4509; H04M 3/38; H04M 1/67; H04M 3/2218; H04M 3/493; H04M 3/50; H04M 3/53341; H04M 1/642; H04M 1/6505; H04M 1/7253; H04M 1/7255; H04M 2203/6009
USPC ... 379/201.02, 142.04, 265.09, 266.1, 93.01, 379/88.08
See application file for complete search history.

(56) References Cited

U.S. PATENT DOCUMENTS

| | | | |
|---|---|---|---|
| 6,292,799 B1* | 9/2001 | Peek | H04M 3/48 |
| 2007/0201634 A1* | 8/2007 | Bonnaud | H04M 3/42017 |
| | | | 379/88.13 |
| 2008/0032675 A1* | 2/2008 | Lee | H04M 1/645 |
| | | | 455/413 |
| 2008/0233932 A1* | 9/2008 | Sapp | G06Q 10/10 |
| | | | 455/415 |
| 2011/0222675 A1* | 9/2011 | Chua | H04L 12/66 |
| | | | 379/93.01 |
| 2014/0057610 A1* | 2/2014 | Olincy | H04W 4/16 |
| | | | 455/414.1 |
| 2014/0206321 A1* | 7/2014 | Mohapatra | H04W 4/12 |
| | | | 455/413 |

* cited by examiner

Primary Examiner — Akelaw Teshale
(74) Attorney, Agent, or Firm — Ronald V. Davidge (57) ABSTRACT

A computer implemented method for communicating with contacts preferably responds to both telephone calls and written text documents, with calls being handled as they are received, and with written documents being temporarily stored before responding. Calls and written documents are monitored to determine the communication styles of the contacts and of the user in dealing with the contacts, with these styles then being applied to the responses, which include answers to questions from the contacts. Connections to other components and systems provide answers regarding the location and scheduling of the user, product inventories, etc.

20 Claims, 7 Drawing Sheets

SYSTEM AND METHOD FOR RESPONDING TO TELEPHONE CALLS AND WRITTEN COMMUNICATIONS

RELATED APPLICATIONS

Not Applicable

FEDERALLY SPONSORED RESEARCH OR DEVELOPMENT

Not Applicable

BACKGROUND OF THE INVENTION

1. Field of the Invention

This invention relates to a computer implemented method for communicating with contacts, and, more particularly, to a method for responding to telephone calls and written text communications from the contact.

2. Summary of the Background Information

Modern electronic devices have done much to improve interpersonal communications by allowing the user of a smartphone to carry it in most cases, providing telephone use with a kind of immediacy that was previously impossible, and by allowing the user to save and later answer a number of types of written messages, such as emails, text messages, and other documents. However, there are still a number of activities, such as attending meetings, in which it is highly undesirable to answer a cellular phone, and other activities, such as driving a vehicle, in which it is dangerous and even illegal to do so. Furthermore, many individuals spend inordinate amounts of time receiving and answering telephone calls and written messages or documents. While various recording methods are employed to alleviate the problem of often being unable to answer the telephone, it is noted that the problem of time requirements is only worsened by having a number of messages to answer when the user becomes available. The general problem of answering telephone and written text messages has resisted automation because of its complexity, with a large number of different types of questions being asked, and with different contacts needing to be treated in different ways, and because of an immediacy being required in responding to a telephone conversation before the contact hangs up. In practice, automated methods for responding to telephone calls have generally been limited to presenting simple, multiple-choice options to which the contact (caller) responds by saying a word or phrase or by pushing one or more telephone keypad numbers.

Many people consciously or unconsciously emulate the person with whom they are communicating, in person, by telephone, or by written communications, in order to appear empathetic with the other person. However, in many instances, this ability to emulate the other person is largely lost because of the large number of different people with whom an individual must deal. Services have been established for monitoring the public communications of individuals throughout the world of English-speaking professionals and for using the results of this monitoring to help people write emails to these professionals. Furthermore, in both written and spoken communications, many people have developed different styles of communicating with different individuals, including spouses, friends, family, and business acquaintances. In general, communication methods using voice synthesis

SUMMARY OF THE INVENTION

In accordance with a first aspect of the invention, a computer implemented method for communicating with contacts includes: receiving a telephone call from a first contact; receiving a first contact identifier identifying the first contact; waiting to receive an audio segment; receiving an audio segment beginning when the first contact starts talking and ending when the first contact stops talking for a predetermined period of time; while the audio segment is being received, determining if a question is being asked and determining a response to each question asked in the audio segment; determining whether the telephone call has ended; in response to determining that the telephone call has not ended, returning to waiting to receive an audio segment; and, in response to determining that the telephone call has ended, ending the telephone answering subroutine.

For example, the computer implemented method is implemented using computer elements with a routine executing within a processor according to stored instructions. The method may be implemented in a computing system or smart device, with user inputs being provided through an interface that is part of the computing system or smart device or with an interface that is part of a remote device connected to the computing system or smart device over a network, such as the Internet or the public switched telephone network.

Preferably, the computer implemented method has an ability to receive and answer written text documents as well as telephone calls, with the method additionally including text data from a written text document transmitted by a second contact; storing the text data in a work-in-process file; in response to determining that the text data is stored within the work-in-process file, starting a text data answering subroutine; while the text data subroutine is running, determining whether a question is asked within the written text document and determining an end of the written text document has been reached. An answer is prepared for each question asked. In response to determining that an end of the written text document has been reached, a written text response is prepared, including answers to all questions in the written text document, with data from the written response document being transmitted to the second contact. For example, a written text document is an email, a text mail, or a document that is scanned to produce text data.

In this way, written text documents are relatively quickly stored, making it possible to postpone the processes involved in examining and responding to a written text document until a conflict with processes that must occur without substantial delay, such answering and responding to a telephone call, is over. Further methods for reducing or eliminating such conflicts may be additionally implemented, depending partly on the level of multitasking available. For example, the text data subroutine may be started only when the telephone answering subroutine is not running, or when it is determined that the operation of the telephone answering subroutine would not be jeopardized by starting the text data answering subroutine. Alternately, the text data answering subroutine is interrupted in response to receiving a telephone call and started in response to determining that the telephone call has ended.

Preferably, the computer implemented method is additionally capable of providing information about the contact that is useful in communicating with the contact. If the user asks for such information during a telephone conversation with a particular contact, information concerning the particular contact is displayed. Otherwise, the user is asked to provide information identifying the contact. Preferably, a menu is displayed for selecting among various types of available information, such as previous written documents or telephone conversations with the contact and previous orders for products placed by the contact.

Preferably, the computer implemented method includes a number of features providing the user with ways to control operation of the method. For example, the method is operated with an AUTO mode turned on or off by the user, with telephone calls and written text documents being answered only when the AUTO mode is turned on. Other controls are directed toward communications with particular contacts, with data providing instructions for handling such communications being stored in a data record associated with the particular contact. For example, this data may indicate that the contact is enabled or not enabled for answering telephone calls and written text documents received from a particular contact. Preferably, the data record is part of a data structure including a data record for each contact, with each data record having a number data fields storing particular types of information.

Preferably, the data records associated with the contacts are additionally used to store scores reflecting the preferred telephone and written text communication styles of various contacts and of the user in communication with the various contacts. For example, a telephone conversation between the first contact and the user is monitored by the computer implemented method, with scores being developed for the telephone communication style of the first contact from audio segments in which the first contact is speaking, and with scores for the communication style of the user in communication with the first contact being developed from audio segments in which the user is speaking. Data from a written text document, from the second contact to the user, is monitored to develop text communication style scores for the contact, and data from a written text document from the user to the second contact is used to develop text communication scores for the user in communication with the second contact. In each instance, when the end of the written text document is reached, it is determined whether corresponding scores have been previously recorded within the daa record of the second contact. If they have been recorded, the present scores are combined with the previously recorded scores before the resulting combined scores are recorded in the data record. If such scores have not been previously recorded, the present scores are recorded in the data record.

In addition, the computer implemented method may receive a user input indicating that written communications with a particular contact are to be reviewed. In response to receiving this user input, data is written to the data record associated with the particular contact so that the written response to text document from the particular client will be sent to the inbox of the user instead of to the client. Preferably, a written response to a contact is additionally sent to the inbox of the user if it is determined by the computer implemented method if it is determined that an accumulated level of confidence is too low. The accumulated level of confidence is based on a calculated level of confidence in each answer to a question from the written text document. Furthermore, messages including text data describing information for the user may be sent to the inbox of the user after the computer implemented method discovers that either a telephone call or a written text document contains such information.

Preferably, the computer implemented method can contact other subroutines or computer systems to receive information for answering questions. For example, if the question relates to finding a location of the user, the answer may be found with data from a GPS system within the device in which the computer implemented method is performed and a calendar app used by the user may also ve consulted. If the question relates to scheduling a meeting wi9th the user, the answer may be found with the calendar app. If the question relates to products for sale, the answer may be found through an inventory control application.

BRIEF DESCRIPTION OF THE FIGURES

These and other aspects of the invention will be made apparent by reading the following specification in conjunction with the accompanying drawings, in which.

DETAILED DESCRIPTION OF THE INVENTION

Figures 1, 2, 3:
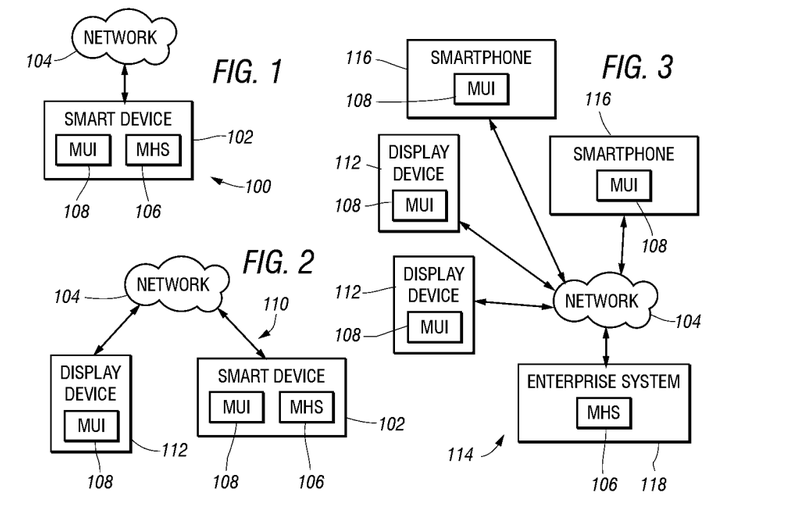
FIG. 1 is a schematic view of a system configured in accordance with a first embodiment of the invention.
FIG. 2 is a schematic view of a system configured in accordance with a second embodiment of the invention.
FIG. 3 is a schematic view of a system configured in accordance with a fourth embodiment of the invention.

FIG. 1 is a schematic view of a system 100 configured in accordance with a first embodiment of the invention to include a smart device 102 connected to a network 104. The smart device 102, which is a portable electronic device, receives telephone calls and one or more forms of written text, such as text messages, emails, and scanned textual documents, and prepares responses to these telephone calls and to the written text through the execution of a message handling system routine 106 stored within the smart device 102. The smart device 102 also includes a message user interface 108, which receives information from the user (i.e. from the individual operating the smart device 12), regarding messages being received and answered, and which provides information to the user. Preferably, the smart device 102 is approximately the size and weight of a modern cell phone, including a number of conventional features to allow it use as a cellphone.

FIG. 2 is a schematic view of a system 110 configured in accordance with a second embodiment of the invention to include the smart device 102 and an additional display device 112, both of which are connected to the network 104, allowing the devices 102, 108 to communicate with one another. Preferably, the display device 112 is small enough to be worn as a wristwatch, including version of the message user interface subroutine 108 in communication with the message handling system routine 106 within the smart device 102

FIG. 3 is a schematic view of a system 114 configured in accordance with a fourth embodiment of the invention to include a number of the display devices 112, along with a number of smartphones 116, each of which is approximately the same size as a modern cellphone, having conventional cellphone features. However, like the display devices 112, the smartphones 116 store and execute the message user interface 108, but not the message handling system 106. Within the system 114, the instructions of the message handling subsystem 108 are stored and executed within an enterprise system computer 118 that is connected to the display devices 112 and the smartphones 116 through a network 104. The enterprise system computer 114, which stores and executes instructions of the message handling system 106 is, for example, operated by a company to provide communication services to be used by its employees, or by a business providing communication services for a number of individuals contracting for such services.

In each of the systems 100, 110, 114, the network 104 preferably includes the public switched telephone network accessed by the smart devices 102, the display devices 112, and the smartphones 116 through one or more cellphone networks, allowing these devices 102, 112, 116 to be moved about and to be operated at remote distances from one another. Preferably, the enterprise system computer 118 is additionally connected to the public switched telephone network. Such an arrangement provides for the reception and transmission of telephone calls and of various kinds of written text, including emails, text messages, and scanned written text documents.

Figure 4:
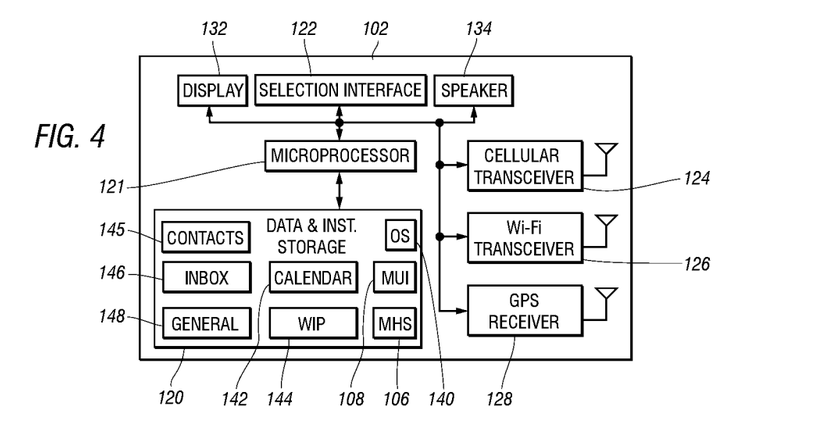
FIG. 4 is a schematic view of a smart device within the system of FIG. 1.

FIG. 4 is a schematic view of a smart device 102 within the system of FIG. 1, which includes data and program storage 120 providing for operation therein of the message handling system routine 106 and of the message user interface subroutine 108. The smart device 102 includes a microprocessor 121 configured to receive inputs from a user (a person using the smart device 102) through a selection interface 122, to receive inputs developed from wireless signals received by a cellular transceiver 124, a Wi-Fi transceiver 126, and a GPS receiver 128. The microprocessor 121 is further configured to provide output signals driving a display 132 and a speaker 134 and to execute program instructions from apps stored within data and program storage 120. For example, the selection interface 122 may be one or more of a number of such devices that are well known to those skilled in the art of designing cellular phones, such as a keyboard with physical and a touch screen device used in conjunction with the display 132 to display keys and other images which are touched to provide inputs to the microprocessor 121.

Data and instruction storage 120 includes an operating system 140, which is used by the microprocessor 120 to maintain data files, to run apps, and to operate various devices within or attached to the smart device 102. Data and instruction storage 120 additionally includes the message handling system routine 106 and the message user interface subroutine 108. Preferably, data and instruction storage 120 additionally stores data and instructions for a calendar app 142, which stores information provided by the user, suing the selection interface 122, to indicate his present and future whereabouts. The calendar app 142 additionally stores information transmitted by others concerning future events, such as meetings that the user is requested to attend. For example, data from the calendar app 142 is accessed by the message handling system routine 106 to answer questions regarding the location and future availability of the user. Data and instruction storage 120 additionally stores a number of data files used by the message handling system routine 106, including a work in process file 144 storing text data waiting to be processed, a contact file 145 storing information identifying contacts, such as past callers, communication styles associated with the individual contacts, and user instructions concerning how to deal with individual contacts, a user inbox file 146 storing data for documents waiting to be read or reviewed by the user, a general data file 148 including instructions describing desired methods for handling phone calls from general contacts (such as callers) that cannot be identified.

Figure 5:
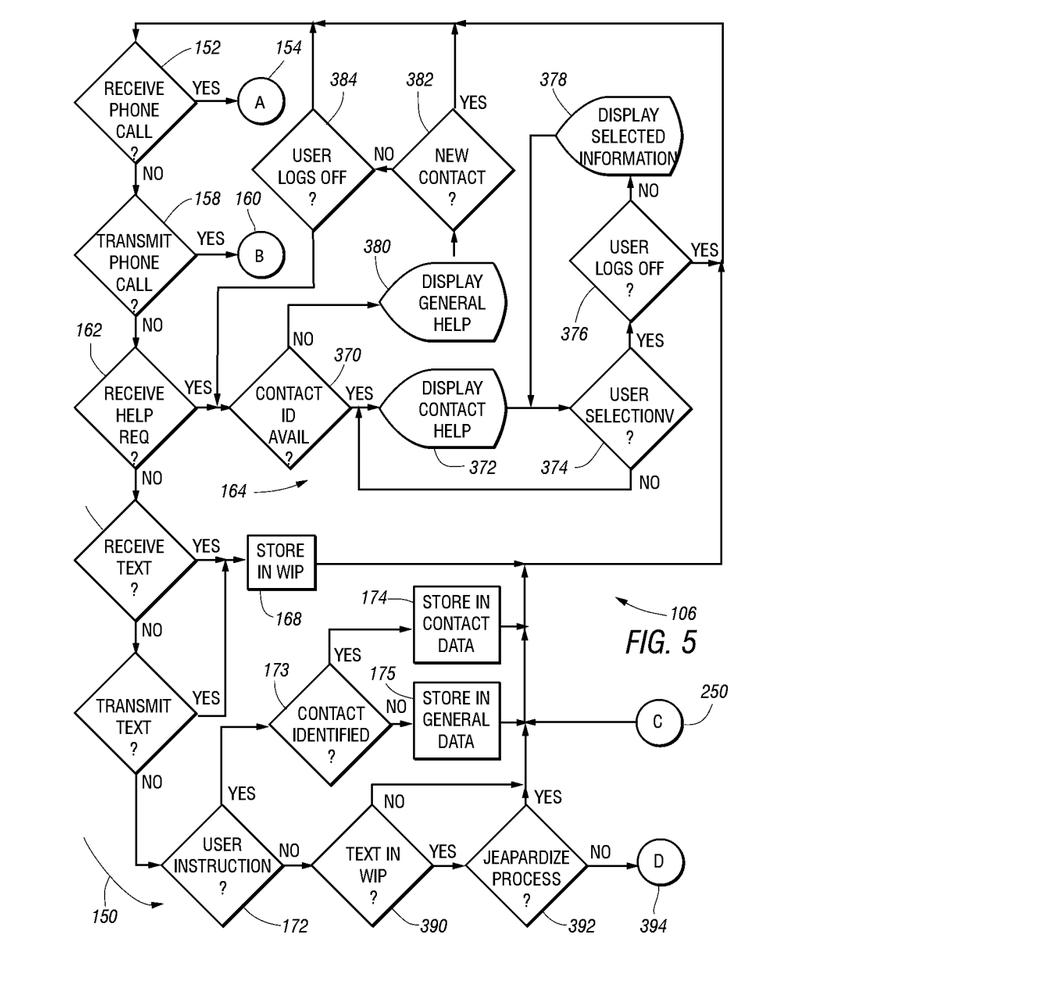
FIG. 5 is a flow chart of processes occurring during the execution of a message handling system routine within a smart device in the system of FIG. 1.

FIG. 5 is a flow chart of processes occurring during execution of the message handling system routine 106 within the smart device 102. The system routine 106 repeatedly runs through a number of steps within a loop 106. First, if it is determined in step 152 that a telephone call is being received by the smart device 102, the subroutine goes to an exit point "A," indicated as 154 to begin a telephone answering subroutine 156, shown in FIG. 6. Such telephone calls are considered to have a need for immediacy, and are answered as they are received, since a substantial delay may cause a telephone call to be lost. If it is instead determined in step 152 that a telephone call is not being received by the smart device 102, a further determination is made in step 158 of whether a telephone call is being transmitted from the smart device 102. If it is being transmitted, the system routine 106 goes to an exit point "B," indicated as 160, to begin a telephone learning subroutine 162, additionally shown in FIG. 6, in which information regarding how the user handles a particular caller is stored by the message handling system routine 106. Since the message handling system routine 106 stores information regarding a number of contacts during its operation, when it is determined in step 162 that a request for such information is being made by the user, the system routine 106 enters a contact help subroutine 164; otherwise the system routine 106 continues to step 166 to determine whether written text is being received, Preferably, the smart device 102 has sufficient multitasking capability to allow operation with a single incoming or outgoing telephone call, to execute steps of the user help subroutine 165, and to continue executing the steps of the loop 150, virtually simultaneously. It is assumed that the telephone system providing the telephone calls itself limits operation to a single incoming or outgoing telephone call, and it is understood that it is desirable to provide operation of the user help subroutine 164 while an incoming or outgoing telephone call, for which such help may be needed, is being processed. However, starting with step 166, written text does not have the immediacy of a telephone call and it therefore stored in the work in process file 144 (shown in FIG. 4) in step 168 when received. Instead, if it is determined in step 166 that a written text is not being received, the message handling system routine 106 proceeds to step 170 to determine whether written text is being transmitted by the user. If it is, the system routine 106 proceeds to step 168, in which the written text being transmitted is stored in the work in process file 144.

Referring again to FIGS. 1 and 4, the message user interface 108 provides the user with an ability to control operation of the message handling system routine 106 by issuing a number of user requests through the selection interface 121. For example, the user may touch an icon on the display screen 132 to start operation of the message user interface 108, and then touch various other icons and displayed alphanumeric keys to form a user request. The user request may determine how the message handling system routine 106 is to operate for all telephone calls and written text documents, or it may describe how the routine 106 is to operate for telephone calls and written messages from a particular contact.

Referring again to FIG. 5, if it is determined in step 170 that written text is not being transmitted from the smart device 102, the message handling system routine 106 proceeds to step 172, in which a further determination is made of whether the user has prepared a user instruction using the message user interface 108 (shown in FIG. 1). Such a instruction may be related to a particular contact, identified by the user in the instruction, or to general operation of the system routine 106 without a need to identify the contact. If it is then determined in step 173 that the user has prepared a user instruction, the instruction is stored in the contacts data file 145 (shown in FIG. 4) in step 174. On the other hand, if it is determined in step 173 that the user has filed an instruction without identifying the contact, the instruction is stored in the general data file 148 (additionally shown in FIG. 4) in step 175.

The operation of the message handling system routine 106 following a determination in step 152 that a telephone call is being received will now be described, with continuing reference being made to FIG. 5, and with additional reference being made to FIG. 6, a flowchart showing a telephone answering subroutine 156, accessed within the message handling system routine 106.

Figure 6:
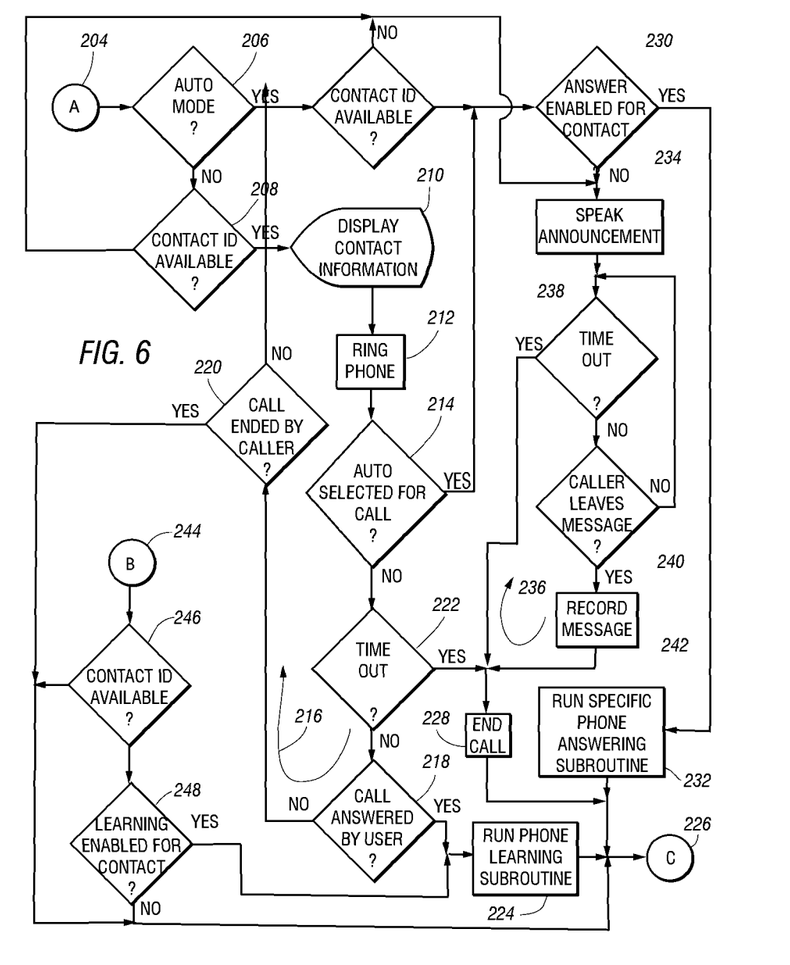
FIG. 6 is a flow chart of a telephone answering subroutine within the message handling system routine of FIG. 5.

The telephone answering subroutine 156 of FIG. 6 is entered at entry point "A," indicated as 204 in FIG. 6, following a determination in step 152 of FIG. 5 that a telephone call is being received. Next, it is determined in step 206 whether the smart device 102 is operating in AUTO mode. In AUTO mode, the smart device 102 answers telephone calls from specified contacts and prepares responses to questions, concerns, etc. expressed by the caller. If the AUTO mode is turned off, only the user can answer a telephone call, but the smart device 102 can help him by supplying information identifying the caller and by answering his request for stored information regarding the contact. Preferably, the user can additionally select the AUTO mode only for use during a single telephone call that is occurring when the selection is made.

If it is determined in step 206 that the smart device 102 is not in AUTO mode, the message handling system routine 106 proceeds to step 208, where a further determination is made of whether the contact ID for the caller is available. For example, the contact ID is selected from a list of known contacts stored within the contact data file 145 using a telephone number provided by the telephone service from which the telephone call is provided. If it is determined in step 208 that the contact ID is available, information stored in the contacts data file 145 (shown in FIG. 4) is used to display information describing the contact on the display screen 132 in step 206, and the telephone is rung in step 212.

The user can additionally place the smart device in AUTO mode for answering a single telephone call, again using the selection interface 122 by touching an icon displayed on the display screen 132. Therefore, after ringing the telephone in step 212, a determination is made in step 214 of whether the AUTO has been selected for the single call being answered. If it has not been selected, the telephone answering subroutine 156 continues in a loop 216, with the contact information continuing to be displayed and with the telephone continuing to ring, until it is either determined in step 214 that AUTO has been selected for the single call, that the call has been answered by the user in step 218 or terminated by the caller in step 220, or that a time limit has been reached in step 222.

When it is determined in step 218 that the telephone call has been answered by the user, the telephone answering subroutine 156 enters a telephone learning process 224 to gain information regarding how the user handles a telephone call from the particular contact making the present telephone call. When this process 224 is completed, or when it is determined in step 220 that the caller has ended the telephone call, the telephone answering subroutine 156 is ended at exit point "C," indicated as 226. When it is determined in step 222 that a predetermined time limit has been reached, the telephone call is ended in step 228 before the subroutine 156 us ended at exit point "C," indicated as 226. If it is determined in step 214 that AUTO has been selected by the user for the presently occurring telephone call, and if it is further determined in step 230 by checking information stored in the contacts data file 154 (shown in FIG. 4) that the telephone answering system routine 156 has been enabled by the user for answering telephone calls from this particular contact, a telephone answering process 232, specifically for the contact is performed before the subroutine 156 us ended at exit point "C," indicated as 226.

On the other hand, if it is determined in steps 206 and 215 that the AUTO mode is on, but that the contact ID is not available, or if it is determined in steps 214 and 230 that AUTO has been selected for the present telephone call, but that the telephone answering subroutine 156 has not been enabled to answer telephone calls from this particular contact, a prerecorded message is spoken to the caller in step 234, with a loop 236 then being entered to wait for a determination in step 238 that a predetermined time has expired or for a determination in step 240 that the caller is leaving a message in response to the announcement of step 234. When it is determined in step 238 that the time has expired, the telephone call is ended in step 228. When it is determined in step 240 that the caller is leaving a message, the message is recorded in step 242. For example, the recording process may include a speech-to-text conversion, with the resulting text being sent to the user's inbox 146 (shown in FIG. 4), with the The telephone answering subroutine 156 is alternatively entered at entry point "B," indicated as 244 in FIG. 6, following a determination in step 158 of FIG. 5 that the user is placing an outgoing telephone call with the smart device 102, providing an opportunity for the telephone answering subroutine 156 to learn how the user interacts with a particular contact. Next, a determination is made in step 246 of the contact identification information is available by checking the contacts data file 145 (shown in FIG. 4) to determine if the user is placing a telephone call to one of the contacts listed within this data file 145. If the contact ID is determined to be available, a further determination is made in step 248 of whether the telephone answering subroutine 156 is enabled for learning information regarding this contact.

Preferably, the contact data file 145 includes, for each contact, separate data indicating whether the subroutine 156 is enabled to answer telephone calls from the client, with this data being examined in step 230, and data indicating whether the subroutine 156 is enable to learn information regarding dealing with the client, with this data being examined in step 248. It is expected that the learning process 224 will have to be repeated a number of times for a particular contact before the specific phone answering process 282 is enabled for that contact. Thus, when it is determined in step 248 that the telephone answering subroutine 156 is enabled for learning with the particular contact called, the telephone learning process 224 occurs. After the completion of the telephone leaning process 224, or after it is determined, either in step 246 that the contact ID is not available, or in step 248 that the telephone answering subroutine 156 is not enabled for the contact being called, the telephone answering subroutine 156 ends at exit point "C" 226. Whenever the telephone answering subroutine 156 ends at exit point "C" 226, the process described above in reference to FIG. 5 is re-entered at entrance point "C," indicated as 250 therein.

Figures 7, 8:
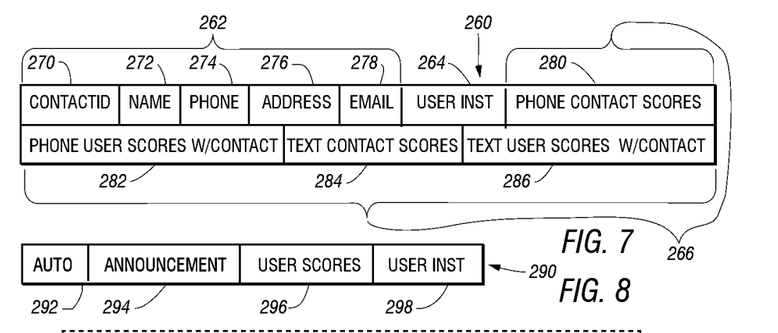
FIG. 7 is a schematic view of a contact data record within a contract data structure within the smart device of FIG. 4.
FIG. 8 is a schematic view of a general data record within the contact data structure within the smart device of FIG. 4.

FIG. 7 is a schematic view of a contact data record 260 within the contacts data structure 145 discussed above in reference to FIG. 4. There is one contact data record 260 for each contact, preferably with a plurality of contact identification and access data fields 262, a user request data field 264, and a number of communication style score data fields 266. For example, the contact identification and access data fields 262 include a contact ID data field 270, a name data field 272 storing the name of the contact, a phone number data field 274 storing the phone number of the contact, an address data field 276 storing the address of the contact, and an email address data field 278 storing the email address of the contact. Preferably, information for the contact identification and access data fields 262 is developed by the message handling system routine 106 during the processing of incoming and outgoing telephone calls and written text. For example the telephone number of a caller is provided with a caller ID feature of the telephone service providing an incoming telephone call, and the user must provide the telephone number of the contact he is calling. Email text documents generally include email addresses and often include mailing addresses as well. The contact ID may be automatically formed by the message handling system routine 106 from the contact name, with numerals being added if multiple contacts have the same name.

The user request data field 264 stores a number of requests made by the user regarding communications with the contact identified by the contact ID stored in step 174. If such a request is made by the user during a telephone conversation or during the preparation of an email, the request is filed in the contact data record 260 corresponding to the contact ID of the telephone call or the email. Otherwise, the user can supply information identifying the contact ID or name of the contact using the message user interface 108 (shown in FIG. 1). For example, the user request data field includes information describing whether the message handling system routine 106 is enabled to answer telephone calls or respond to emails from the caller associated with the particular contact data record 260.

The communication style data fields 266 include a phone contact scores data field 280, storing data developed while the contact talked during telephone calls, a phone user scores with contact data field 282, storing data developed while the user talked with this contact during telephone calls, a text contact score data field 284, storing data developed from written text documents sent from the contact, and a text user score data field 286, storing data developed from written text communications from the user to the contact. Each of the communication style data fields 266 includes a number of individual scores rating the communication style of the person speaking or writing in areas such as difficult versus simple language, the use of technical jargon versus the use of plain language, the use of stories to support explanations, the use of words indicating anger versus the use of words indicating calmness, etc.

It is known that people in face-to-face and telephone conversations tend to imitate the communication style of the person with whom they are talking to communicate a feeling of empathy with his point of view. Many people use different styles in telephone conversations and written documents.0. While it is additionally known that this effect can be overdone, in accordance with a preferred version of the present invention, data from the phone contact scores, stored within phone contact scores field 280, is used by the message handling system routine 106 to provide telephone conversations with at least a portion of the communication style of the contact, to show empathy with the contact. Similarly, when written text is prepared to send to the contact by the message handling system routine 106, data from the text contact scores, stored within text contact scores field 284, is used by the message handling system routine 106 to provide written text with at least a portion of the communication style of the contact.

Furthermore, within the message handling system routine 106, processes of learning the communication style of the user in dealing with the particular contact identified in the contact ID data field 270 are implemented, with data developed during telephone conversations while the user is talking to the contact being stored in the phone user scores with contact data field 282, and with data developed from written text sent from the user to the contact being stored in the text user scores with contact data field 286. In this way, the message handling system routine 106 is prepared to represent the user, responding to the user in a communications style that the user would use in response to this particular contact.

FIG. 8 is a schematic view of a general data record 148 within data and instruction storage 120 discussed above in reference t6o FIG. 4. Data stored within the general data record 148 is used to respond to telephone calls and written text when the contact ID of the person calling or the person sending the written text is unavailable. For example, the contact ID is not available if it has not yet been established for the particular contact, even though the caller ID is available from the telephone company supplying telephone service. When a person calls for the first time, his contact ID generally has not yet been established. The general data record 148 additionally includes an AUTO data field 292, storing an indication of whether the message handling system routine 106 is to be operated in the AUTO mode, and an announcement data field 294 storing an announcement to be made in step 234 of the telephone answering subroutine 156 (shown in FIG. 6). For example, the announcement may be stored as an audio message, having been recorded by the user, or as a written text message to be converted using a text to speech feature. Preferably, the general data record 148 additionally includes a text user scores data field 296 for storing data describing the communication style of the user when talking on the telephone and for preparing written communications for which a contact (recipient) is not identified. Preferably, the general data record 148 additionally includes a user instruction data field 298 holding instructions stored in step 175 (shown in FIG. 5).

Figure 9:
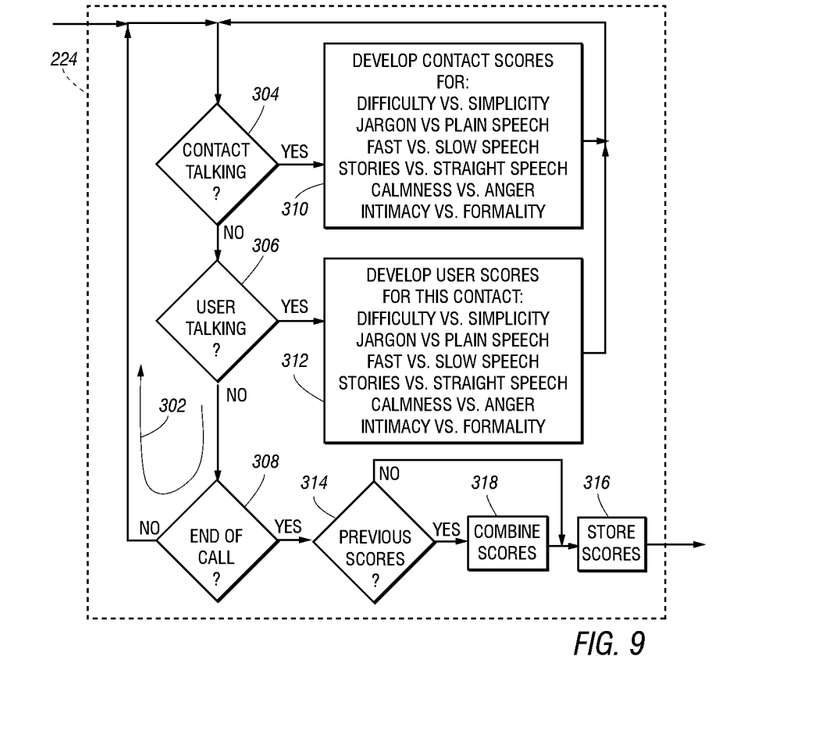
FIG. 9 is a flow chart of a telephone learning process within the telephone answering subroutine of FIG. 6.

FIG. 9 is a schematic view of the telephone learning process 224 within the telephone answering subroutine 156 (shown in FIG. 6), which monitors a telephone conversation to determine the communication styles of the contact and of the user when communicating with the contact. The telephone learning process 224 operates in a loop 302 to determine, in step 304 that the contact is talking, in step 306 that the user is talking, or, in step 308, that the telephone call is ended. If it is determined in step 304 that the contact is talking, communication style scores for the contact are developed for the contact in a process 310 while the contact continues to talk. If it is instead determined in step 304 that the contact is not talking, with a further determination being made in step 306 that the user is talking, communication style scores for the user with this contact are developed in a process 312. In either case, when talking stops, the process 310, 312 is ended, with the telephone learning process returns to the loop 302 to make further determinations. In this way, a When it is determined in step 306 that the user is not talking, and when a further determination is them made in step 308 that the telephone call has not ended, the telephone learning process 224 continues to operate in the loop 302. When it is instead determined in step 308 that the end of the telephone call has been reached, a further determination is made in step 314 regarding whether previous communication style scores have been stored for this contact in the telephone contact scores data field 280 or for the user talking to this contact in the telephone user contact data field 282. If such previous communication style scores have not been stored in the data fields 280, 282, in step 316 the scores developed during the telephone call just determined in step 308 to have ended are stored in data field 280, while the scores developed during process 312 are stored in data field 282. On the other hand, if it is determined in step 314 that previous scores have been stored in the data fields 280, 282, these previous scores are combined in step 318 with the scores developed during the telephone call just determined in step 308 to have ended. The process of combining scores may provide additional weight to the more recently developed scores.

Figure 10:
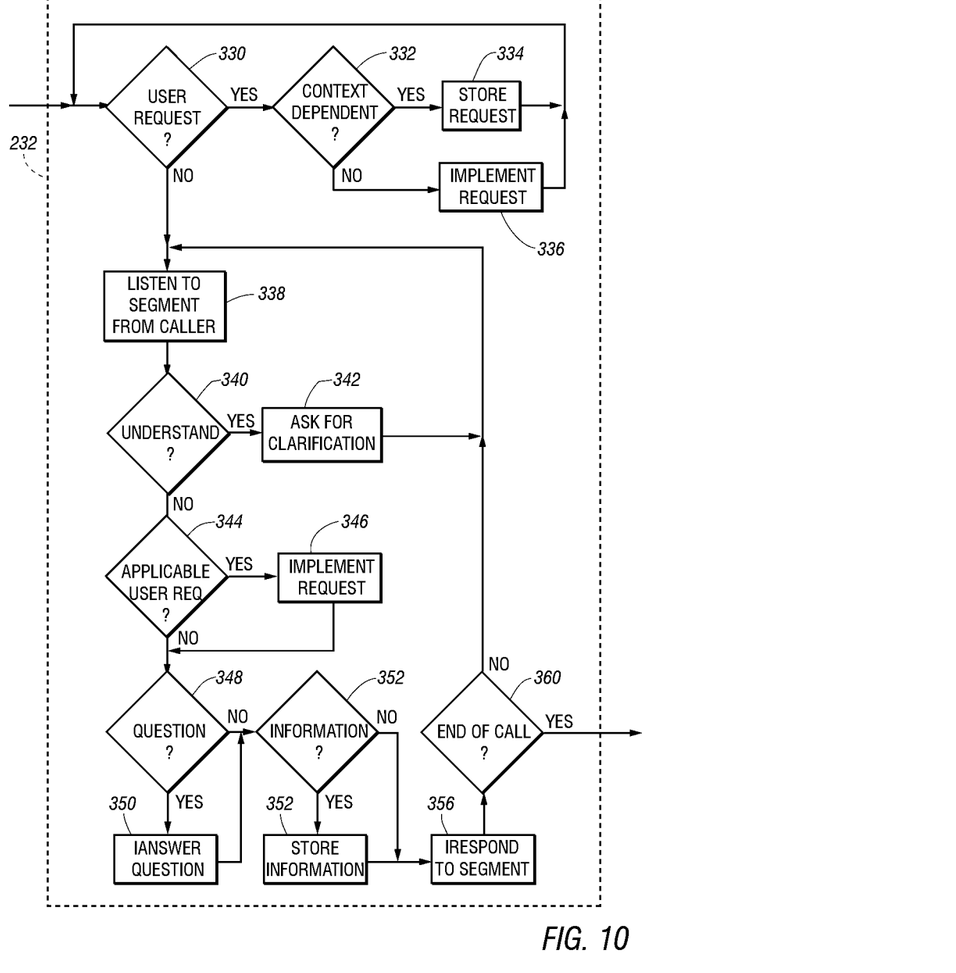
FIG. 10 is a flow chart of a specific telephone answering process within the telephone answering subroutine of FIG. 6.

FIG. 10 is a schematic view of the telephone answering process 232 within the telephone answering subroutine 156 (shown in FIG. 6). It is noted that, before the telephone answering process 232 is entered, it must be determined, either in step 214 or in step 215 of the telephone answering subroutine 156 that the contact ID for the present telephone call must be available The telephone answering process 232 begins in step 330 with a determination of whether user requests are stored in user request data field 264 of the data record 260 (shown in FIG. 7) having the contact ID of the present telephone call stored within its contact ID data field 270. If it is determined in step 330 that one or more such user requests are stored, a further determination is made in step 332 of whether one of the stored context-dependent (i.e. is the performance of the request dependent on the context of the telephone conversation). Any such context-dependent user request is temporarily stored in step 334 for use in the present telephone call if the context thereof shows that a need to use the requests has arisen. Following the storage of a user request in step 334 and following the implementation of a request in step 336, the telephone answering process returns to step 332 to determine if there is another request stored within the user request data field 264. When it is determined in step 332 that one or more user requests is not context dependent, such requests are implemented in step 336 without waiting to determine the context of the telephone conversation.

It is understood that the telephone conversation is composed of a sequence of segments in which the caller (contact) is talking, with these segments being separated as needed by intervening periods in which speech to the caller is synthesized by the telephone answering process 232. Thus, after determining in step 330 that there are no user requests stored in the user request data field 264 or that all the requests in the user data field have been stored in step 334 or implemented in step 336, the audio content of a segment of the telephone call is heard in step 338. The end of the segment is recognized by a predetermined time period without conversation. The processing of the segment may include speech-to-text conversion to provide for the processing of text. Next, in step 340, it is determined whether the segment was understandable. If it was not, a request for clarification is made in step 342, with the telephone answering process 232 then returning to step 338 to receive clarification in the next segment of the telephone call. When it is determined in step 340 that the segment is understandable, a further determination is made in step 344 of whether one or more of the user requests stored in step 334 applies to the context of the segment. If so, the applicable user requests are implemented in step 346.

Next, in step 348, the segment heard in step 332 is analyzed to determine if it contains any questions. If it does, an answer to one or more questions is formulated in step 350. Preferably, the telephone answering subroutine 156 has access to various sources of data stored within the smart device 102 and to information accessible to the smart device 102. For example, if the question is about the whereabouts of the user, the telephone answering routine 156 accesses a calendar application 142 (shown in FIG. 4) to find information to use in formulating an answer to the question. Such information can also be found by using the GPS receiver 128 (additionally shown in FIG. 4) or information stored from previously using the GPS receiver 128 to determine the location of the user, assuming that he is carrying the smart device 102, and whether he is staying in the location, walking, or driving. Many questions dealing with the particular business of the user can be answered by contacting particular systems accessible to the smart device 102. For example, an inventory control system may be contacted to provide answers for questions regarding product cost and availability.

If it is determined in step 348 that there are no questions in the segment heard in step 338, or if the process of determining answers to questions in step 350 has been completed in step 350, a further determination is made in step 352 of whether information meant for the user has been provided in the segment. If it has, the information is stored in step 354. For example, information is converted to written text using a speech-to-text function and stored in the user's inbox file 146 (shown in FIG. 4). Then, when the recording process of step 352 is completed, or if it determined in step 354 that there is no information to store in step 352, an audio response including the answers formulated in step 350 is prepared and spoken for transmission in step 356. Preferably, data describing the telephone style of the contact, stored in data field 280, and data stored in data field 282, describing the telephone style of the user while talking to the contact, is used to emulate a combination of these styles, providing empathy with the contact, and adjusting the style as appropriate for the contact, wheth4er a business contact, spouse, or family member, etc.

If it is then determined in step 360 that an end of the telephone call has not been reached, the telephone answering process 232 returns to step 338 to listen to the next audio segment from the caller. On the other hand, when it is determined in step 360 that the telephone call has been ended, either by the caller or by the telephone answering subroutine 156, the telephone answering process 232 and the telephone answering subroutine 156 are both ended through exit point "C," indicated as 156 (shown in FIG. 5).

Additionally referring again to FIG. 5, whenever the telephone answering subroutine 156 ends at the exit point "C," indicated as 156, loop 150 of the message handling system routine 106 is re-entered at entry point "C," indicated as 250.

The smart device 102 stores or has access to much information on contacts that can be used by the user while talking to a contact over the telephone or while preparing a written communication to be sent to the contact. For example, such information may include a history of past telephone conversations and written communications with the contact, a history of orders placed by the contact, a history of complaints made by the contact, etc. In accordance with a preferred embodiment of the invention, such information is presented to the user in response to determining, in step 162 of FIG. 5, by a contact help subroutine 164, beginning with a determination in step 370 of whether the contact ID for the contact for which information is desired is available. For example, the contact ID may have been prepared and stored within the smart device 102 when a telephone call was received, when a telephone call was being placed, or when a written communication, such as an email, was begun. Thus, when it is determined in step 370 that the contact ID is available, the message handling system routine 106 causes a contact help menu to be displayed in step 372, providing a number of selections of data available for this contact. The user then makes a selection in step 374. He may select to log off; if he does, the message handling system routine 106 returns to the loop 150 in step 376. Otherwise, information relative to the contact is displayed in step 378. Preferably, this display of information includes a control allowing the user to cause the menu information to be displayed, so that he can make another selection. On the other hand, if it is determined in step 370 that the contact ID is not available, a general help menu is displayed in step 380, allowing the user to supply information identifying the contact or to log off. If it is then determined in step 382 that the contact is a new contact, for which information is not available, or if it is determined in step 384 that the user has signed off the message handling system routine 106 returns to the loop 150; otherwise, the routine 106 returns to step 370 to determine whether the contact ID can be determined.

In accordance with the above discussion, as written text documents were encountered by the message handling system routine 106, they are stored in the work-in-process file 144 (shown in FIG. 4), allowing processes requiring virtually immediate attention, such as answering a call or handling a user request for information to proceed and continue. However, referring to FIG. 5, when step 390 is encountered as the message handling subroutine moves along loop 150 a determination is made of whether written text is waiting in the work-in-process file 144. If it is, and if it is further determined in step 392 that a process of handling text can be begun without jeopardizing processes requiring more immediacy, the routine 106 exits the processes of FIG. 5 at exit point "D," indicated as 394. Otherwise, the routine 106 continues around to loop 150, returning to step 152.

Figure 11:
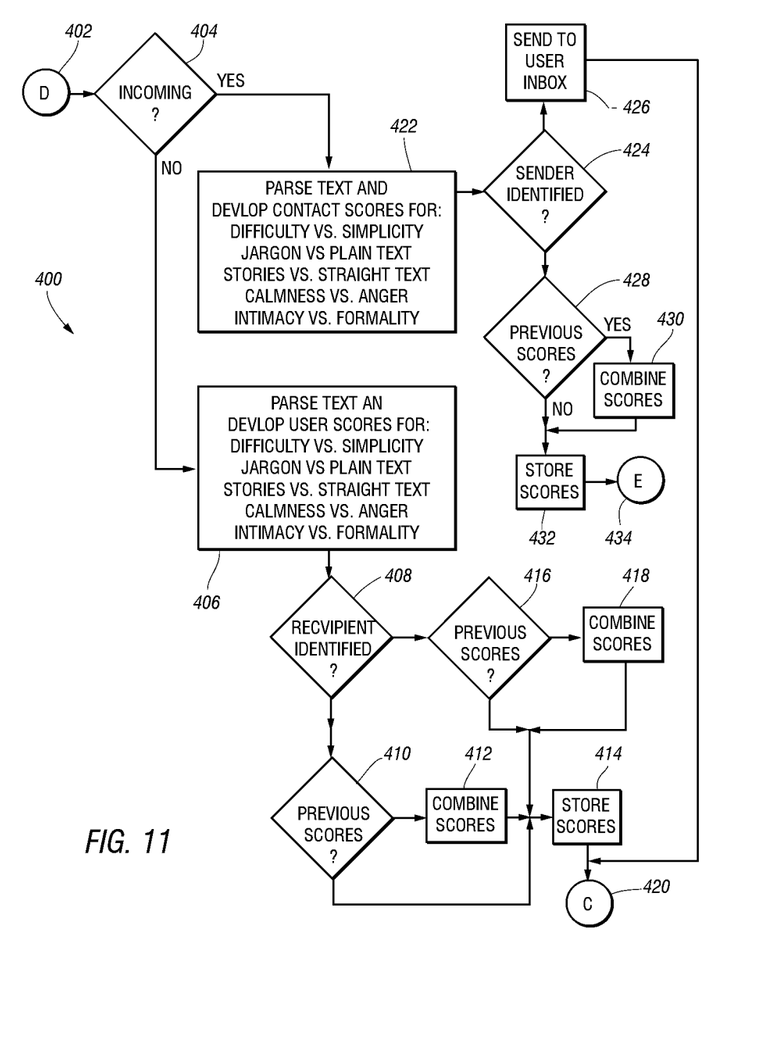
FIG. 11 is a schematic view of a written document learning process within the message handling subroutine of FIG. 5.

FIG. 11 is a schematic view of a written document learning process 400 within the message handling system routine 106, which is used to monitor written communications of the contact and of the user in communication with the contact to determine communication styles. This document learning process 400 is entered at entry point "D," indicated as 402, when exiting the processes of FIG. 5 at exit point "D," indicated as 394.

Referring to FIGS. 7, 8, and 11, in step 404, it is determined whether the written document being examined from the work-in-process file 144 is an outgoing document. If it is an outgoing document, in a preferred version of the invention, it is to be studied to learn about a writing style of the user in the preparation of a document to be sent to the particular contact (recipient) to whom the document has been sent, with contact scores for the user regarding written communications with this contact, or with an unidentified recipient being developed in step 406. Then, in step 408, it is determined whether the contact (recipient of the written communication) has been identified. If he has, and if it is further determined in step 410 that previous text communication style scores have been saved for the user in communication with the contact within data field 286 of the data record 260 associated with this contact, the scores most recently generated in step 406 are combined with the previously stored scores in step 412, with the combined scores being stored in the data field 286 in step 414. If it is instead determined in step 410 that there are no previous scores stored in the data field 286, the stores most recently generated in step 406 are stored in the data field 286.

On the other hand, if it is determined in step 408 that the contact (recipient) has not been identified in the written communication, an additional determination is made in step 416 regarding whether there are any previous text user scores stored in the data field 296 within the general data record 148, which holds scores concerning the written communications style of the user. If data is stored in the data field 296, in step 418 it is combined with the data most recently developed in step 406 for recording in the data field 296. Otherwise, the data from step 406 is itself recorded in the data field 296 in step 414. In any case, after data is recorded in step 414, the message handling system routine 106 exits the written document learning process 400 at exit point "C," identified as 420, returning to loop 150 at entrance point "C," identified as 250 in FIG. 5.

If it is instead determined in step 404 that the written document being examined from the work-in-process file 144 is an outgoing document, in a preferred version of the invention, it is to be studied to learn about a writing style of the contact (sender of the document), with communication style scores being developed by parsing the document in step 422. Then, in step 424, the data developed by parsing in step 422 is used to determine if the sender has been identified. If he has not been identified, data from the document, which was apparently received in error, is sent to the user's inbox in step 426. On the other hand, if it is then determined in step 424 that the contact (sender0 has been identified, a further determination is made in step 428 of whether previous communication style scores for this contact are stored within data field 284 of the data record 260 associated with this contact. If such scores are found, in step 430 they are combined with the scores most recently determined in step 422, before the combined scores are stored in the data record 260 in step 432 in srtep 432. If no scores are found to be stored in the data field 284, the scores most recently determined in step 422 are stored therein. In either case, after data is recorded in step 432, the message handling system routine 106 exits the written document learning process 400 at exit point "E," identified as 432.

Figure 12:
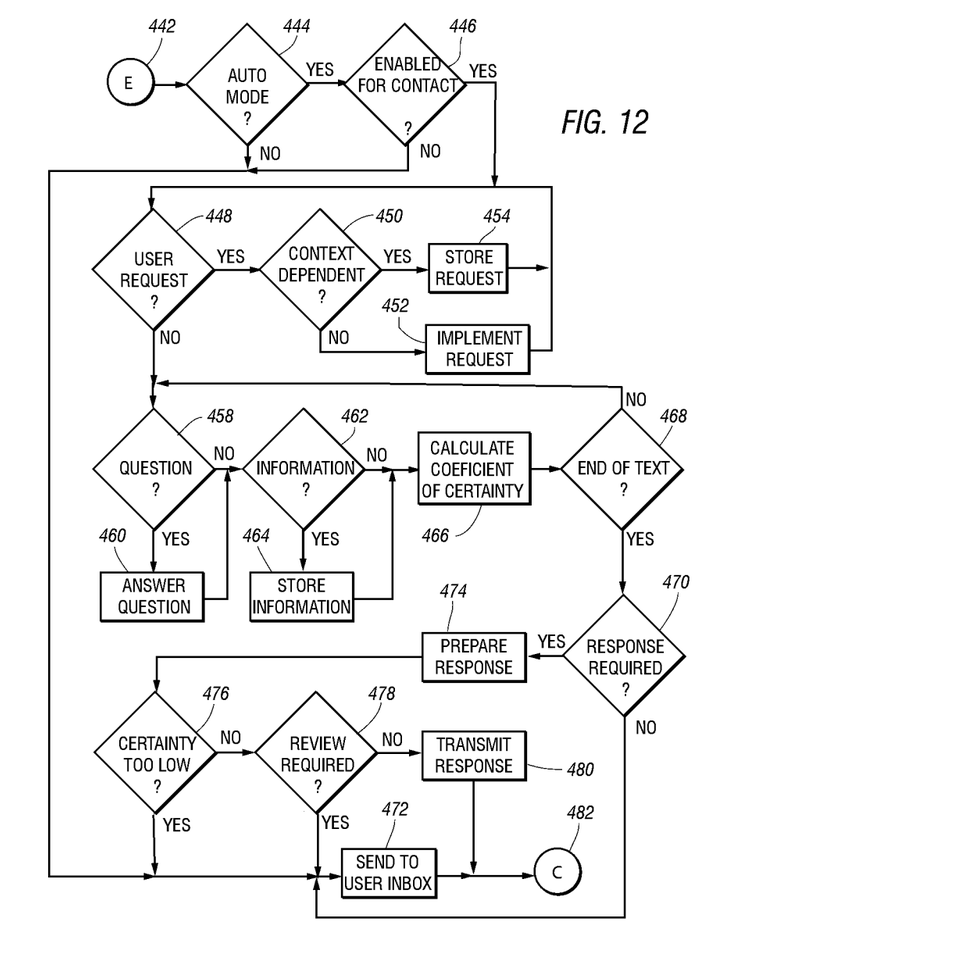
FIG. 12 is a schematic view of a written document answering process accessed from the written document learning process of FIG. 11.

FIG. 12 is a schematic view of a written document answering process 440, which is entered through entry point "E," indicated as 442, after leaving the document learning process 400 of FIG. 11 through exit point "E," indicated as 434. The written document answering process 440 begins with a determination in step 444 of whether the smart device 102 is operating in an AUTO mode, allowing at least certain written documents to be answered automatically, and with a further determination being made in step 446 of whether the smart device 102 has been enabled to answer written documents from the particular contact, which has been found to be identified in step 424 of FIG. 11. IF the smart device 102 is not operating in AUTO mode, or if the smart device 102 has not been enabled for this particular contact, data from the written document being studied is sent to the user inbox file 146 (shown in FIG. 4).

On the other hand, if it is determined in steps 444, 446 that the smart device 102 is operating in AUTO mode and that the smart device 102 has been enabled to answer documents from the contact, it is further determined in step 448 whether there are any user requests for handling documents from this contact within the data field 264 of the data record 260 associated with the contact (shown in FIG. 7). If such requests are found, it is further determined in step 450 whether each request is dependent upon the context of the written document. If it is not, it is implemented in step 452; otherwise, it is stored in step 454 for implementation as the context of the written document is developed.

Next, the written document is parsed in repeated passes around a loop 456 to determine its content, with questions found in step 458 being answered in step 460, with information found in step 462 being stored in step 464, and with a cumulative level of certainty in the understanding of the written document and in the correctness of answers developed in step 460 being generated in step 466. This process is ended with a determination in step 468 that an end of the text within the written document has been reached.

Then, in step 470, it is determined whether a response to the written document that has just been examined is required by the context of the document itself. For example, a response is needed if one or more questions were found in step 458, it is indicated that a response is required. If a response is not required, a copy of the written document is written to the user inbox 146 (shown in FIG. 4) in step 472. If a request is instead required, it is prepared in step 474. Preferably, both the written text communication style scores associated with the contact, stored in data field 284 and the written text communication style scores of the user when communicating with this contact, stored in data field 286, with both of these data fields 284, 286 forming part of the data record 260 associated with the contact and shown in FIG. 7, if such data is available. The use of the data communications style of the contact provides a degree of empathy with the contact, while the use of the communications style of the user in corresponding with the contact provides a result that is more likely to be agreed upon by both the user and the contact.

Following the preparation of a response in step 474, it is determined in steps 476 and 478 whether the user needs to review the response. Particularly, if it is determined in step 476 that the cumulative coefficient of certainty is below a threshold level, or if it is determined in step 478 that the user has caused an indication that he wants to review documents being sent to this contact, and/or documents that arrive from this contact, to be placed in data field 264 of the data record 260 (shown in FIG. 7) associated with this contact, the document(s) is/are sent to the user inbox 146 (shown in FIG. 4) in step 472. If it is not determined in step 476 that the cumulative level of confidence is too low, or in step 470 that one or more documents have to be forwarded to the user, the response document is sent to the contact in step 480. Then, after step 472 or after step 480, the written document answering process 440 ends at exit point "C," with the message handling system subroutine 106 returning.

While the invention has been described in terms of preferred embodiments with some degree of particularity, it is understood that this description has been given only by way of example, and that many changes can be made without departing from the spirit and scope of the invention, as defined in the appended claims.

What is claimed is:

1. A computer implemented method for communicating with contacts, comprising:
   receiving a telephone call from a first contact;
   in response to receiving the telephone call, starting a telephone answering subroutine;
   receiving a first contact identifier identifying the first contact;
   waiting to receive an audio segment;
   receiving an audio segment beginning when the first contact starts talking and ending when the first contact stops talking for a predetermined length of time;
   while the audio segment is being received, determining if a question is being asked and determining a response to each question asked during the audio segment;
   following an end of the audio segment, generating and transmitting a response segment including a response to each question asked in the audio segment;
   determining whether the telephone call has ended; and
   in response to determining that the telephone call has not ended, returning to receive an audio segment;
   in response to determining that the telephone call has ended, ending, the telephone answering subroutine;
   monitoring a telephone call between the first contact and a user of the computer implemented method;
   while the telephone call is being monitored, determining when the first contact is speaking and when the user is speaking;
   in response to determining that the first contact is speaking, developing a plurality of first contact telephone scores indicating a telephone communication style of the first contact;
   in response to determining that the user is speaking, developing a plurality of user with first contact telephone scores indicating a telephone communication style for the user in communication with the first contact;
   determining that the telephone call being monitored has ended;
   determining whether data describing a telephone communication style of the first contact is stored in a first data field of a data record associated with the first contact;
   in response to determining that data describing a telephone communication style of the first contact is not Stored in the first data field, staring the plurality of first contact telephone stores in the first data field;
   in response to determining that data describing a telephone communication style of the first contact is stored in the first data field, combining the data stored in the first data field with the plurality of first contact telephone scores to form combined user telephone scores and storing the combined user telephone scores in the first data field;

determining whether data describing a telephone communication style of the user in communication with the first contact is stored in a second data field of a data record associated with the first contact;

in response to determining that data describing a telephone communication style of the user in communication with the first contact is not stored in the second data field, storing the plurality of user in communication with the first contact telephone stores in the first data field; and in response to determining that data describing a telephone communication style of the user in communication with the first contact is stored in the second data field, combining the data stored in the second data field with the plurality of user in communication with the first contact telephone scores to form combined user in communication with the first contact telephone scores and storing the combined user telephone scores in the second data field, wherein the telephone communication style first contact and the telephone communication style of the user in communication with the first contact are emulated in generating the response to each question asked.

2. The computer implemented method of claim 1, additionally comprising:

receiving a first user input indicating that the computer implemented method is to be enabled for answering a telephone call from the first contact;

writing data indicating that the computer implemented method is enabled for answering a telephone call to a data record associated with the first contact in response to receiving the first user input receiving a second user input indicating that the computer implemented method is not to be enabled for answering a telephone call for the first contact;

writing data indicating that the computer implemented method is not enabled for answering a telephone call to a data record associated with the first contact in response to receiving the second user input; and determining whether the computer implemented method is enabled for answering a telephone call from the first contact by reading data stored in the data record associated with the first contact, wherein the steps of determining if a question is being asked, determining a response to each question asked, and generating and transmitting a response to each question asked occur only following an additional determination that the first contact is enabled for answering a telephone call from the first contact.

3. The computer-implemented method of claim 1, additionally comprising, during operation of the telephone answering subroutine:

receiving a user input requesting information regarding the first contact;

causing a menu to be displayed showing types of available information; and causing information described by the menu to be displayed.

4. A computer implemented method for communicating with contacts, comprising:

receiving a telephone call from a first contact;

in response to receiving the telephone call, starting a telephone answering subroutine;

receiving a first contact identifier identifying the first contact;

waiting to receive an audio segment;

receiving an audio segment beginning when the first contact starts talking and ending when the first contact stops talking for a predetermined length of time;

while the audio segment is being received, determining if a question is being asked and determining a response to each question asked during the audio segment;

following an end of the audio segment, generating and transmitting a response segment including a response to each question asked in the audio segment;

determining whether the telephone call has ended; and in response to determining that the telephone call has not ended, returning to receive an audio segment;

in response to determining that the telephone call has ended, ending the telephone answering subroutine;

receiving text data from a written text document transmitted by a second contact;

storing the text data in a work-in-process file;

determining that the text data is stored in the work-in-process file;

in response to determining that the text data is stored in the work-in-process file, starting a text data answering subroutine;

while the text data answering subroutine is running, determining whether a question is asked within the written text document and determining that an end of the written text document has been reached;

preparing an answer for each question asked within the written text document; and in response to determining that an end of the written text document has been reached, preparing a written text response including answers to all questions in the written text document and transmitting data from the written text response to the second contact.

5. The computer implemented method of claim 4, wherein the text data answering subroutine is started only while the telephone answering subroutine is not running.

6. The computer implemented method of claim 5, wherein the text data answering subroutine is interrupted in response to receiving a telephone call and started in response to determining that the telephone call has ended.

7. The computer implemented method of claim 4, additionally comprising:

receiving a third user input indicating that an AUTO mode is to be turned on;

turning the AUTO mode on in response to receiving the first user input;

receiving a second user input indicating that the AUTO MODE is to be turned off;

turning the AUTO mode off in response to receiving the second user input; and determining whether the AUTO MODE is turned on or off, wherein steps within the telephone answering subroutine of determining if a question is being asked; determining a response to each question asked, and generating and transmitting a response to each question asked occur only following an additional determination that the AUTO mode is turned on, and wherein the determination of whether a question is asked within the written text document, the preparation of an answer for each question asked within the written text document, the preparation of preparing a written response, and the transmission of the written response to the second contact occur only following an additional determination that the AUTO mode is turned on.

8. The computer implemented method of claim 4, additionally comprising:
- receiving a first user input indicating that the computer implemented method is to be enabled for answering a telephone call from the first contact;
- writing data indicating that the computer implemented method is enabled for answering a telephone call to a data record associated with the first contact in response to receiving the first user input receiving a second user input indicating that the computer implemented method is not to be enabled for answering a telephone call for die first contact;
- writing data indicating that the computer implemented method is not enabled for answering a telephone call to a data record associated with the first contact in response to receiving the second user input; and
- determining whether the computer implemented method is enabled for answering a telephone call from the first contact by reading data stored in the data record associated with the first contact, wherein the steps of determining if a question is being asked, determining a response to each question asked, and generating and transmitting a response to each question asked occur only following an additional determination that the first contact is enabled for answering a telephone call from the first contact.

9. The computer implemented method of claim 8, additionally comprising:
- receiving a fourth user input indicating that the computer implemented method is to be enabled for answering a written text document from the second contact;
- writing data indicating that the computer implemented method is enabled for answering a written text document from the second contact to a data record associated with the second contact in response to receiving the fourth user input
- receiving a fifth user input indicating that the computer implemented method is not to be enabled for answering a written text document from the first contact;
- writing data indicating that the computer implemented method is not enabled for answering a written text document from the second contact to a data record associated with the second contact in response to receiving the fifth user input; and
- determining whether the computer implemented method is enabled for answering a written text document from the second contact, wherein the steps of determining if a question is being asked, wherein the determination of whether a question is asked within the written text document; the preparation of an answer for each question asked within the written text document, and the preparation of preparing a written response occur only following an additional determination that the that the computer implemented method is enabled for answering a written text document from the second contact.

10. The computer implemented method of claim 9, wherein
- the computer implemented method is implemented in accordance with steps of a routine executing within a computing device, and
- the routine is controlled by user inputs through a remote device connected to the computing system through a network.

11. The computer implemented method of claim 4, additionally comprising:
- monitoring a telephone call between the first contact and a user of the computer implemented method;
- while the telephone call is being monitored, determining when the first contact is speaking and when the user is speaking;
- in response to determining that the first contact is speaking, developing a plurality of first contact telephone scores indicating a telephone communication style of the first contact;
- in response to determining that the user is speaking, developing a plurality of user with first contact telephone scores indicating a telephone communication style for the user in communication with the first contact;
- determining that the telephone call has ended;
- determining whether data describing a telephone communication style of the first contact is stored in a first data field of a data record associated with the first contact;
- in response to determining, that data describing a telephone communication style of the first contact is not stored in the first data field, storing the plurality of first contact telephone stores in the first data field;
- in response to determining that data describing a telephone communication style of the first contact is stored in the first data field, combining the data stored in the first data field with the plurality of first contact telephone scores to form combined user telephone scores and storing the combined user telephone scores in the first data field;
- determining whether data describing a telephone communication style of the user in communication with the first contact is stored in a second data field of a data record associated with the first contact;
- in response to determining that data describing a telephone communication style of the user in communication with the first contact is not stored in the second data field, storing the plurality of user in communication with the first contact telephone stores in the first data field; and
- in response to determining that data describing a telephone communication style of the user in communication with the first contact is stored in the second data field, combining the data stored in the second data field with the plurality of user in communication with the first contact telephone scores to form combined user in communication with the first contact telephone scores and storing the combined user in communication with the first contact telephone scores in the second data field, wherein the telephone communication style first contact and the telephone communication style of the user in communication with the first contact are emulated in generating the response to each question asked.

12. The computer implemented method of claim 4, additionally comprising:
- monitoring a written text communication between the second contact and a user of the computer implemented method;
- determining whether the second contact or the user sent the document;
- in response to determining that the second contact sent the written text communication, developing a plurality of second contact text scores indicating a text communication style of the second contact;
- in response to determining that the user sent the document, developing a plurality of user with second contact text scores indicating a text communication style for the user in communication with the second contact;
- determining that an end of the written text document has been reached;

determining whether data describing a text communication style of the first contact is stored in a third data field of a data record associated with the second contact;
in response to determining, that data describing a text communication style of the second contact is not stored in the third data field, storing the plurality of second contact text stores in the third data field;
in response to determining that data describing a text communication style of the second contact is stored in the third data field, combining the data stored in the third data field with the plurality of second contact text scores to form combined user text scores and storing the combined user text scores in the third data field;
determining whether data describing a written text communication style of the user in communication with the second contact is stored in a fourth data field of a data record associated with the second contact;
in response to determining that data describing a text communication style of the user in communication with the second contact is not stored in the fourth data field, storing the plurality of user in communication with the first contact telephone stores in the first data field; and
in response to determining that data describing a text communication style of the user in communication with the first contact is stored the fourth data field, combining the data stored in the fourth data field with the plurality of user in communication with the second contact data scores to form combined user in communication with the second contact data scores and storing the combined user in communication with the second contact data scores in the fourth data field, wherein the text communication style of the second contact and the text communication style of the user in communication with the second contact are emulated in preparing the written text response to the second contact.

13. The computer implemented method of claim 4, additionally comprising:
receiving a sixth user input indicating that a document responding to a written text communication from the second user is to be reviewed;
in response to receiving the sixth user input, storing required review data in a fifth data field within the data record associated with the second contact;
in response to determining that an end of the written text document has been reached, determining whether required review data is stored in the fifth data field; and
in response to determining that required review data is stored in the fifth data field, sending data from the written text response to an inbox of the user, wherein data from the written text response is transmitted to the second contact only in response to determining that the required review data is not stored in the fifth data field.

14. The computer implemented method of claim 4, wherein
a process of determining if a question is being asked during the telephone answering subroutine includes determining if the question relates to finding a location of the user,
following a determination that the question relates to finding a location of the user, a process for generating a response segment includes finding information from a calendar app and a GPS system,
a process of preparing an answer for each question asked within a written text document includes determining whether a question within the written document relates to finding a location of the user, and, in response to determining that a question within the written text document relates to finding a location of the user, finding information from a calendar app and a GPS system.

15. The computer implemented method of claim 4, wherein
a process of determining, if a question is being asked during the telephone answering subroutine includes determining if the question relates to scheduling a meeting with the user,
following a determination that the question relates to scheduling a meeting with the user, a process for generating a response segment includes finding, information from a calendar app,
a process of preparing an answer for each question asked within a written text document includes determining whether a question within the written document relates to scheduling a meeting with the user, and, in response to determining that a question within the written text document relates to scheduling a meeting with, finding information from a calendar app.

16. The computer implemented method of claim 4, wherein
a process of determining if a question is being asked during the telephone answering subroutine includes determining if the question relates to finding information about products for sale,
following a determination that the question relates to finding information about products for sale, a process for generating a response segment includes finding information from an inventory control routine,
a process of preparing an answer for each question asked within a written text document includes determining whether a question within the written document relates to finding information about products for sale, and, in response to determining that a question within the written text document relates to finding information about products for sale, finding information from an inventory contra routine.

17. The computer implemented method, of claim 4, additionally comprising
receiving a user input requesting information regarding a contact;
causing a menu to be displayed types of available information regarding the contact; and
causing information described by the menu to be displayed.

18. The computer implemented method of claim 4, additionally comprising
while the audio segment is being received, determining that information for the user is being received and saving text data representing the audio information for the user, and in response to additionally determining that the telephone call has ended, preparing and saving a document including the text data representing the audio information for the user to an inbox file for the user; and
while the text data answering subroutine is running, determining that text information for the user is stored within the text document and saving the text information for the user, and, in response to determining that an end of the text document has been reached, preparing and sending a document including the text information for the user to an inbox file of the user.

19. The computer implemented method of claim 4, additionally comprising:

after preparing an answer for each question asked within the written text document, determining a level of certainty regarding the probable correctness of the answer;

in response to determining that an end of the written text document has been reached, combining levels of certainty determined while preparing an answer to each question within the written text document to form a combined level of certainty, and sending information from the text document and the written text response to an in inbox file of the user in response to determining that combined level of certainty is below a predetermined level, wherein data from the written text response is sent to the second contact only following a determination that the combined level of certainty is not below the predetermined level.

20. The computer-implemented method of claim 4, additionally comprising, during operation of the telephone answering subroutine:

receiving a user input requesting information regarding the first contact;

causing a menu to be displayed showing types of available information; and causing information described by the menu to be displayed.

* * * * *